United States Patent
Vickers et al.

(10) Patent No.: US 7,297,957 B1
(45) Date of Patent: Nov. 20, 2007

(54) APPARATUS AND METHOD FOR GAIN CALIBRATION OF A RADIATION DETECTOR

(75) Inventors: David S. Vickers, Independence, OH (US); William G. Greathouse, Brecksville, OH (US)

(73) Assignee: GVI Technology Partners, Ltd., Twinsburg, OH (US)

( * ) Notice: Subject to any disclaimer, the term of this patent is extended or adjusted under 35 U.S.C. 154(b) by 50 days.

(21) Appl. No.: 11/101,673

(22) Filed: Apr. 8, 2005

Related U.S. Application Data (60) Provisional application No. 60/560,857, filed on Apr. 9, 2004.

(51) Int. Cl.
  *G01T 1/161* (2006.01)
(52) U.S. Cl. .................................. 250/363.09
(58) Field of Classification Search ............ 250/363.09
  See application file for complete search history.

(56) References Cited

U.S. PATENT DOCUMENTS

| | | | |
|---|---|---|---|
| 5,079,424 A | 1/1992 | Kobayashi | |
| 5,171,986 A * | 12/1992 | Loomis et al. | 250/252.1 |
| 5,237,173 A | 8/1993 | Stark et al. | |
| 5,412,215 A | 5/1995 | Shuto et al. | |
| 5,550,377 A | 8/1996 | Petrillo et al. | |
| 5,677,536 A * | 10/1997 | Vickers | 250/363.09 |
| 6,087,656 A | 7/2000 | Kimmich et al. | |
| 6,342,698 B1 | 1/2002 | Stark | |
| 2003/0057375 A1 * | 3/2003 | Williams et al. | 250/363.09 |

* cited by examiner

*Primary Examiner*—Dave Porta
*Assistant Examiner*—Marcus H Taningco
(74) *Attorney, Agent, or Firm*—Pearne & Gordon LLP (57) ABSTRACT

A method and apparatus for calibrating the sensors of a radiation detector by collecting a radiation spectrum detected by the detector during an irradiation, calculating a peak energy location from the collected radiation spectrum, determining if the peak energy location is mislocated from a desired location; and adjusting the gain setting for the selected radiation sensor so that the peak energy location is no longer mislocated from the desired location.

25 Claims, 4 Drawing Sheets

APPARATUS AND METHOD FOR GAIN CALIBRATION OF A RADIATION DETECTOR

CROSS-REFERENCES TO RELATED APPLICATIONS

This application claims the benefit of provisional patent application Ser. No. 60/560,857 filed on Apr. 9, 2004, incorporated herein by reference.

BACKGROUND OF THE INVENTION

This application relates generally to a device and method of gain calibration for a radiation detector. More specifically, this application relates to a device and method which allows a technician to efficiently set up a medical imaging gamma detector for gain calibration, start the calibration, and then proceed to address other tasks while the gain calibration automatically runs unattended.

In the field of Medical Imaging, one modality is nuclear medicine (gamma camera) imaging. This imaging can use a detector consisting of a scintillator backed by a plurality of either single anode photomultiplier tubes (PMTs) or multi-anode position sensitive PMTs (PSPMTs) with appropriate electronics. For brevity in the upcoming discussion, PMTs and/or PSPMTs will be referred to as PMTs, but anyone skilled in the art will recognize that either can be used with appropriate modifications. Furthermore, additional sensor types may become available in the future that can be used to replace or supplement PMTs.

In one application of such imaging, a patient is given a radioisotope either by injection or ingestion and then the detector(s), after being placed in close proximity to the patient, can determine where the radioisotope goes or has gone. Then, the device is used to detect the radioisotope as it travels through the patient.

The process of detection occurs when the radioisotope emits radiation, such as a gamma photon, for example, in the direction of the detector, and the photon is absorbed by a scintillator. The scintillator emits a flash of light (a scintilla) which is detected by one or more of the plurality of PMTs. The PMTs closer to the flash have a higher signal than those further away. By measuring the intensity of the flash at each PMT, and then using a centroid type calculation, a fairly accurate estimation of where the flash occurred is possible in a manner that is known in the art.

One of the chief requirements of high quality gamma camera imaging is good calibration of the detector(s) for accurate detection of the gamma photons. The typical calibration consists of, in order:
1. Offset calibration;
2. Gain Calibration;
3. Linearity and Energy calibration (in either order, different manufacturers have different preferences); and
4. Uniformity or flood calibration.

The Offset calibration measures the quiescent output of the PMTs to allow its subtraction, which can be done in a manner that is known in the art. This allows the PMT signals to use the full range of the analog to digital converter (ADC).

Next is the gain calibration, which can be performed in a manner known in the art. To achieve high quality images, all the PMTs need to have the same output signal for the same input signal, i.e., they must have the same gain.

Next is either linearity then energy calibration or energy then linearity calibration, which can also accomplished in a manner that is known in the art. Linearity calibration measures the displacement of a calculated (detected) position from its actual position and creates a correction table (e.g., a look up table (LUT)). Energy calibration measures the energy peak at a multitude of detector positions and calculates a correction factor for each position so all peaks will be at the same channel.

Lastly, is the uniformity or flood calibration, which can be accomplished in a manner known in the art. This step typically involves flooding the entire detector input face with a uniform intensity of gamma rays. This is usually done by using a point source of radioisotope at some distance (usually 5 multiplied by the largest dimension of the detector). Any deviations from a uniform response in the images is typically corrected using a LUT of some type.

One of the problems of the above calibration techniques calibration is that they are typically time consuming and operator intensive. For instance, to do a traditional gain calibration, a technician will typically move a radioactive source collimated through a hole over the center of each of the PMTs in sequence. While the source is over a given PMT, its gain is calculated and adjusted. This can be very time consuming for the technician, who could be doing another task if the calibration could be automated.

Alternatively, some manufacturers simply flood the detector with a uniform intensity of gamma rays and try to pick appropriate signals as indicative of a given PMTs gain, as shown in U.S. Pat. No. 5,550,377, incorporated herein by reference. This is very difficult to do and can be prone to substantial undesirable errors.

Another group of methods involve using LEDs or other light references, as shown in U.S. Pat. Nos. 6,342,698; 6,087,656; 5,412,215; 5,237,173; 5,079,424, all incorporated herein by reference. These methods assume that the PMTs respond to the light sources in the same way as the scintilla, which is not generally true. U.S. Pat. No. 6,087,656, incorporated herein by reference, teaches the use of an ultraviolet source to excite the scintillation crystal so the PMTs are calibrated using the same light as detected during operation. While this may be an improvement over prior methods, there is still the problem of picking appropriate signals, as indicative of a given PMTs gain as in the flood technique.

It would be useful, for example, to allow a technician to efficiently set up a detector for gain calibration, start an automated gain calibration process, and then proceed to address other tasks while the gain calibration runs unattended.

SUMMARY OF THE INVENTION

Provided is method for calibrating a radiation detector including a radiation sensor, with the method comprising the steps of:
  setting a gain for the sensor to a non-zero value;
  irradiating the detector with a radiation source;
  collecting a radiation spectrum detected by the detector;
  calculating a peak energy location from the collected radiation spectrum;
  determining if the peak energy location is mislocated from a desired location beyond an acceptable deviation amount;
  if the peak energy location is mislocated from a desired location beyond the acceptable deviation amount, adjusting the gain setting; and
  performing the irradiating, collecting, calculating, determining and, if necessary, the adjusting steps until the peak energy location is located within the acceptable deviation from the desired location, thereby resulting in an acceptable gain setting.

Also provided is a method for calibrating a radiation detector including a plurality of photomultiplier tubes, with the method comprising the steps of:

setting an initial gain for each of the photomultiplier tubes;

irradiating the detector with the radiation source, wherein radiation passes through the plurality of holes of the gain mask;

collecting a radiation spectrum for one or more of the plurality of photomultiplier tubes during the irradiating step;

calculating a peak energy location from the collected radiation spectrum;

determining if the peak energy location is mislocated from a desired location beyond an acceptable deviation amount;

if the determining step determines that the peak energy location is mislocated beyond an acceptable deviation amount, then adjusting the gain setting for one or more of the one or more of the photomultiplier tubes; and repeating the irradiating, collecting, calculating, and determining steps until the determining determines that the peak energy location is located within the acceptable deviation from the desired location for each of the plurality of photomultiplier tubes, thereby resulting in a calibrated gain setting for each of the plurality of photomultiplier tubes.

Also provided is a method for calibrating a radiation detector including a plurality of radiation sensors, with the method comprising the steps of:

a) selecting one of the plurality of radiation sensors;

b) setting the gain for the selected radiation sensor to a non-zero value and setting the gain for the remaining of the plurality of radiation sensors to about zero;

c) irradiating the detector with a radiation source;

d) collecting a radiation spectrum detected by the detector during the irradiating step;

e) calculating a peak energy location from the collected radiation spectrum;

f) determining if the peak energy location is mislocated from a desired location beyond an acceptable deviation amount;

g) if the determining step determines that the peak energy location is mislocated, then adjusting the gain setting for the selected radiation sensor, and repeating steps (c) through (g) until the determining determines that the peak energy location is located within the acceptable deviation from the desired location;

h) recording the gain setting for the selected radiation sensor when the determining determines that the peak energy location is located within the acceptable deviation from the desired location;

i) resetting the gain for the selected radiation sensor to about zero;

j) selecting another one of the plurality of radiation sensors; and k) performing steps (c) through (k) until each of the plurality of radiation sensors have been selected.

Further provided are one or more of the above methods automated on a computer/processor using software to implement portions of the method in an automated fashion.

Still further provided is a radiation detector including a plurality of radiation sensors, and an apparatus for calibrating the radiation detector, the apparatus comprising: means for selecting one of the plurality of radiation sensors; means for setting the gain for the selected radiation sensor to a non-zero value and for setting the gain for the remaining of the plurality of radiation sensors to about zero; a gain mask for masking the radiation detector from a radiation source; means for irradiating the detector with a radiation source; means for collecting a radiation spectrum detected by the detector during the irradiating; means for calculating a peak energy location from the collected radiation spectrum; means for determining if the peak energy location is mislocated from a desired location beyond an acceptable deviation amount; means for adjusting the gain setting for the selected radiation sensor if the means for determining determines that the peak energy location is mislocated, until the means for determining determines that the peak energy location is located within the acceptable deviation from the desired location; means for recording the gain setting for the selected radiation sensor in a memory when the means for determining determines that the peak energy location is located within the acceptable deviation from the desired location, wherein each one of the plurality of sensors is selected by the apparatus in order to record the gain setting of the each one of the plurality of sensors.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE PREFERRED EMBODIMENTS

Provided is a device and method which allows a technician to efficiently set up a medical imaging gamma detector for gain calibration, start the calibration process, and then proceed to address other tasks while the gain calibration automatically runs unattended. Alternatively, the method could also be implemented manually, while still offering some benefits over current calibration methods.

Figure 1:
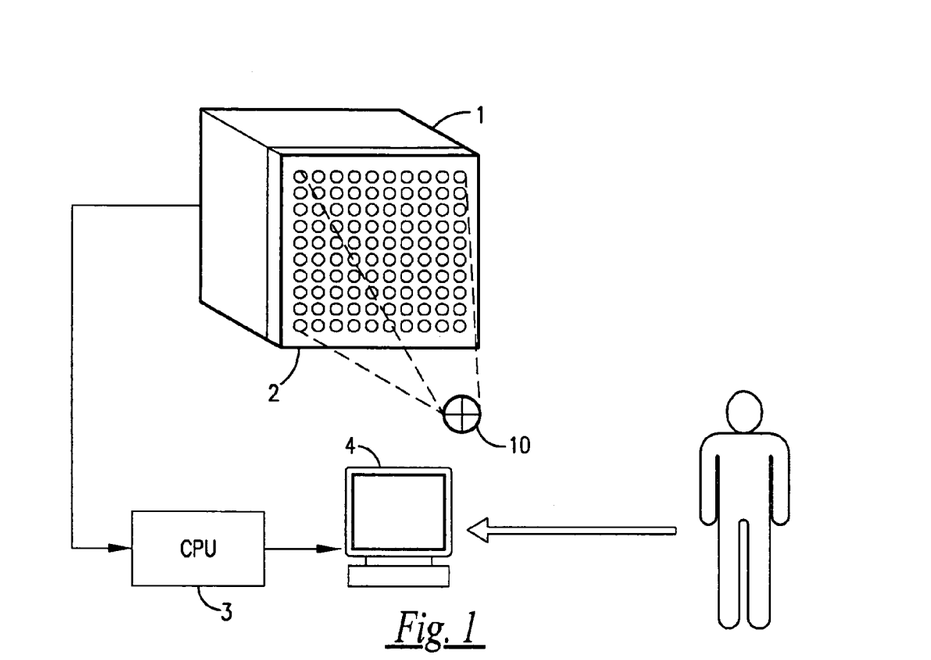
FIG. 1 is a block diagram showing the invention in the context of its environment.

The invention in the context of its use is shown generally in FIG. 1. FIG. 1 shows a radiation detector 1 with a lead gain mask 2, connected to a processor 3, which is connected to a Graphical User Interface (GUI) 4 for displaying information to a technician/operator.

Figure 2:
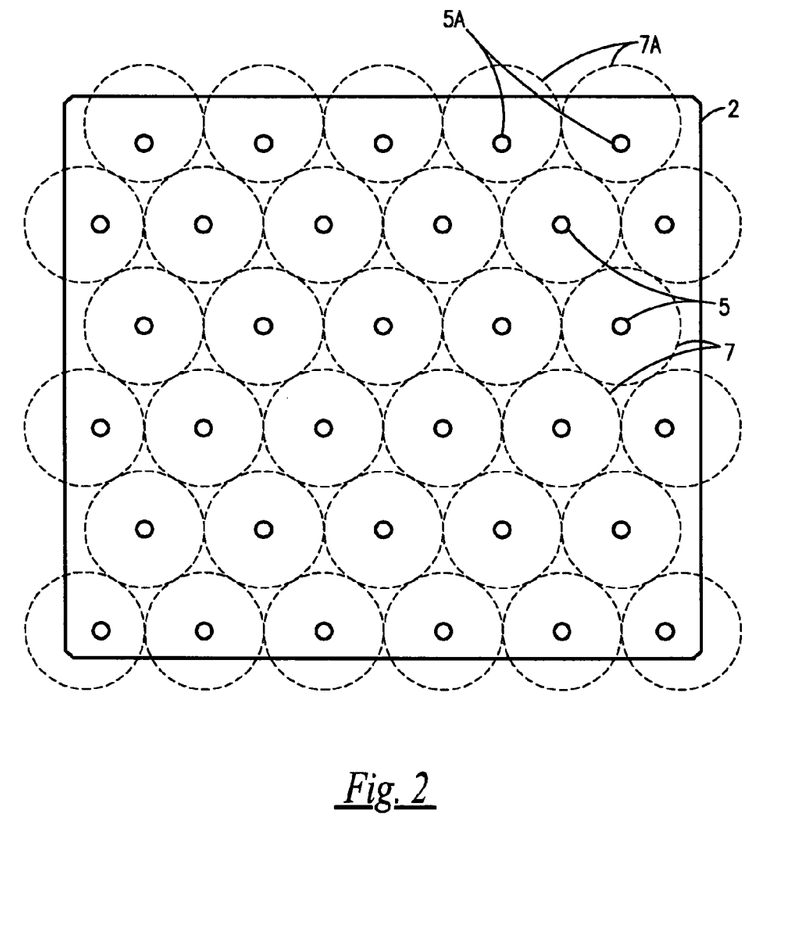
FIG. 2 shows a schematic of a lead gain mask attached to the face of a detector.

The lead gain mask 2 is attached to the face of the detector 1 which consists of a plurality of photo-multiplier tubes (PMTS) for detecting scintilla generated by a scintillation crystal, for example, which has absorbed radiation, such as gamma rays, for example. The mask 2 is shown in FIG. 2. The gain mask 2 in this current embodiment has one layer of lead approximately 3 mm thick, sandwiched between two layers of aluminum or some other low absorption material. The gain mask 2 also has a plurality of holes 5, 5A positioned over the center, when possible, of a plurality of PMTs 7, 7A shown by the broken lines. The holes are drilled through all the layers to allow gamma photons to pass and impinge on the detector crystal only in localized areas. A number of the plurality of PMTs are edge PMTs 7A, wherein corresponding holes 5A are positioned approximately halfway between the inner edge of each edge PMT 7A and the outer edge of the scintillation crystal (not shown). Thus, the holes 5A for the edge PMTs 7A are offset from the edge PMT centers, as shown in FIG. 2.

The calibration method described below can be implemented manually or automatically. The automatic implementation utilizing a computer control, for example, is the preferred means of implementing the method, and is described in detail. Alternatively, a technician could implement the method manually.

In the current embodiment of the invention and referring to FIGS. 1 and 2, the gain mask 2 is mounted to the face of the detector 1, and a radioactive source 10 is placed so as to irradiate the detector through the holes 5, 5A in the gain mask 2. The radioactive source 10 can be a point source positioned some distance away from the detector 1 and the gain mask 2, for example. Alternatively, a sheet (area) source placed on the face of the gain mask could be utilized, as another example.

In the current embodiment, a setup and gain program is executed on a computer to implement the entire, following sequence, or portions thereof. The program of the current embodiment is written in the C programming language using a windowing environment for GUI control. The computer in the current embodiment is the same computer used to collect, analyze and display patient data. Communication with the detector and its components is via USB in the current embodiment. Of course, alternate embodiments using another programming language, and/or using a dedicated processor and/or another communication technology could also be used.

Figure 3:
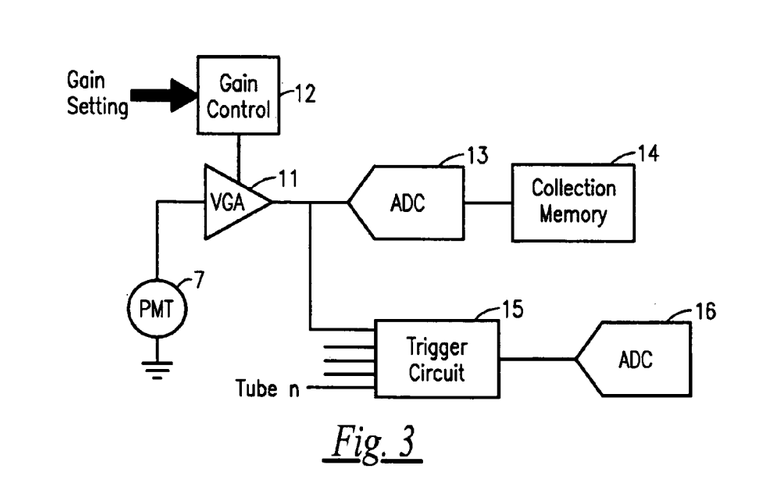
FIG. 3 shows a block diagram of the calibration device.

FIG. 3 of the current embodiment shows the PMT 7 output going to the variable gain amplifier (VGA) 11, which is controlled by the digital gain control 12. Each PMT has its own, dedicated VGA. The output of the VGA 11 goes to both the Analog to Digital Converter (ADC) 13, and the trigger circuit 15. The output of the ADC 13 goes to the data collection memory 14, while the output of the trigger circuit 15 goes to its own ADC 16 for conversion to a digital signal to be used for detector control and timing.

As shown in FIG. 3, each PMT 7 through n is connected to the amplifier 11 with a digitally selectable gain, which can be from about zero (0.0) to about one (1.0), for example, as in the current embodiment.

To perform the gain calibration, all PMTs initially have their gain set to zero (or as close to zero as possible, or perhaps by turning the PMT off, for example) using the gain control 12. A first PMT is selected by the computer and has its gain electronically set to a value somewhere in the midrange value, e.g., set to 0.25 or 0.5, for example. A spectrum, i.e., graph of counts, versus energy or channel for that PMT is collected and the peak location (energy) is found by fitting a quadratic curve, for example, of the form:

$$y = ax^2 + bx + c$$

to, for example, the top three points.

If the energy peak is determined to be mislocated (e.g., by the computer), the gain is adjusted up or down, as appropriate, and another peak is collected. The process is repeated until the energy peak is located within some accepted deviation (e.g., 25 ADC counts) from the desired location. When finished with one PMT, the gain is saved to memory, or to a disk drive, for example, and then that PMT gain is electronically reset back to 0.0 (or as close as possible), by the computer, and the next PMT is selected for adjustment by the computer. This process repeats until all PMTs are adjusted, and their calibrated gain determined and stored.

If the system being calibrated has the capability of passing individual PMT data to the calibration computer, an even faster method of calibration is possible by modifying the current embodiment. In this alternate embodiment, all PMTs are set to their initial gain value, (e.g., they are all turned on). The detector is then flooded with the gain mask in position. As data is passed to the computer, a spectrum is created for each PMT by finding the maximum value of all the PMTs. This maximum value identifies the PMT which had the scintillation over it. After a sufficient number of counts in a given PMTs spectrum, the peak location is found, an adjustment is calculated, if needed, and the PMT gain is adjusted and the spectrum is cleared. The process is then repeated until each PMT peak location is within some acceptable deviation from the desired target, and all PMT calibrated gains have been determined and set and/or stored.

If the technician is doing a recalibration for either of the above described methods, then instead of using the 0.25 or 0.5 gain as a starting point, the system can select the previously (stored) calibrated gain value, which may lead to a quicker calibration result.

The gain target location (channel) is selected by analyzing the analog-to-digital chain of the detector. After taking into account all bit depths of ADCs, accumulators, the width of the peak, and how many pileup events are allowed, a value for the spectrum peak target can be determined which will allow the data to not overflow under the specified conditions.

For instance, it can be shown mathematically that the total integrated value of a decaying exponential can be determined from the decay constant multiplied by the peak value. In the digital sampling case, the decay constant should be in units of samples, not time. This is mathematically proven as follows:

$$\int_0^\infty A * e^{-(t/tau)} dt = A * (-tau * e^{-(t/tau)})_0^\infty$$

$$\int_0^\infty A * e^{-(t/tau)} dt = -tau * A * (e^{(-\infty/tau)} - e^{-(0/tau)})$$

$$\int_0^\infty A * e^{-(t/tau)} dt = -tau * A * (0 - 1)$$

$$\int_0^\infty A * e^{-(t/tau)} dt = tau * A$$

As an example, if the sample rate is 25 nsec and the decay constant is 250 nsec, then the integrated value of a peak is 10 (because 250/25=10) multiplied by the peak value. If the peak value of the analog to digital converter (ADC) is 1023 (10 bits), for example, then the integrated value would be 10230.

However, if one wished to allow pulse pileups (defined as a second event starting before a first event is finished integrating) then the peak value must be less than the maximum of 1023 ADC counts. Allowing pulse pileups greatly enhances the count rate capability of a system. This provides significant advantages when one is trying to perform a high count rate study, such as a First Pass cardiac study, for example. For example, if one wants to allow 2 pulses, then each pulse must fit in 9 bits or 511 ADC counts. Because pulses rarely are piled exactly on top of one another (e.g., the first pulse probably has already started to decay before the second pulse occurs), we can reasonably allow perhaps 10% more, i.e., about 550 per pulse. This would mean the spectrum peak target value would need to be about 5500 (10* 550) ADC counts for this example.

Figure 4:
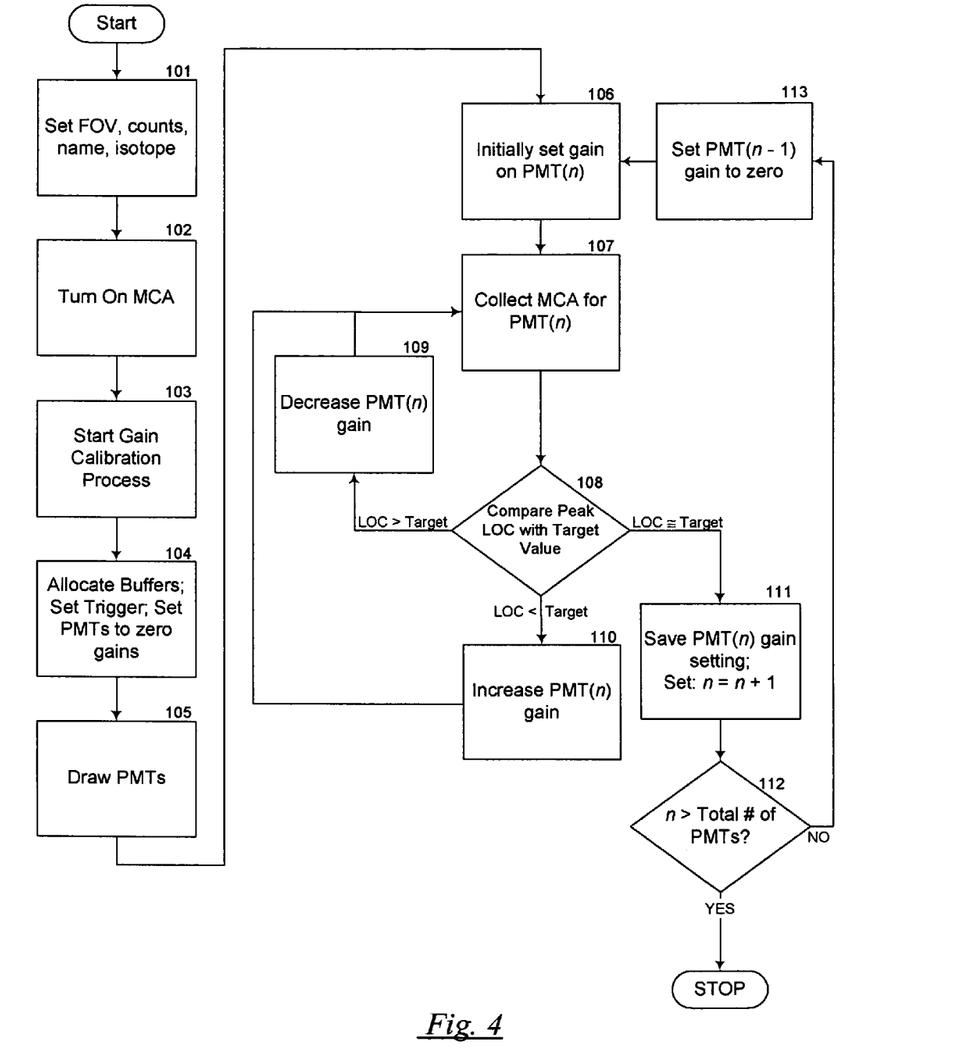
FIG. 4 is a flow chart of one embodiment of the calibration method.
Figure 5:
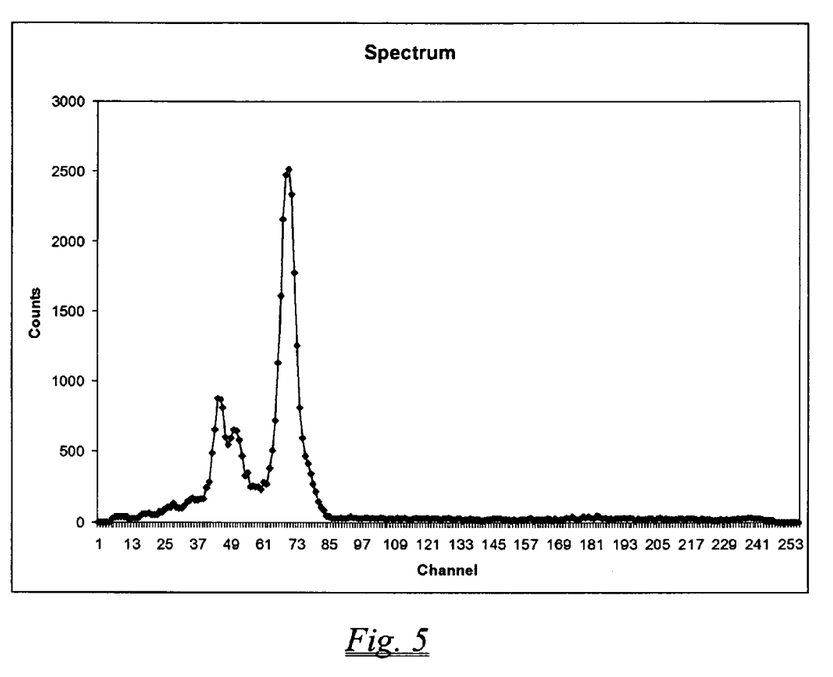
FIG. 5 is a plot of a PMT spectrum according to the method of FIG. 4.

The flow chart of FIG. 4 illustrates one implementation of the software to perform the method of the current embodiment. In the flow chart, step 101 is a setup step. It sets the field of view (FOV) to ensure all PMTs are capable of being examined, the number of counts to collect in a spectrum, a name to be tagged on any data saved, and the isotope to be used. Different isotopes have different energy emissions that should be taken into account. The spectrum peak target value can be adjusted, depending on what isotope energy is being used. Step 102 merely turns on the multichannel analyzer (MCA), the device or system that actually collects the spectra. Steps 103 and 104 start the gain calibration, allocating any data buffers used, setting the trigger value for the PMTs, and setting all gains on PMTs to about zero (0.0, as near zero as practical). The draw PMTs step 105 is used to provide a graphical display showing the progress of the calibration to provide status information.

The calibration process is performed in steps 106-112. The radiation process is not shown in this flow chart, and could be continuous or intermittent over these steps (for example, the radiation could be limited to occur during step 107 operation). The gain of the selected PMT i.e., PMT(n) is set to an initial value (as discussed above), and the radiation spectrum is collected in step 107. The peak location (LOC) is determined and compared with the target value at step 108, and if the peak LOC is greater than the target (beyond the acceptable deviation, as discussed above), then step 109 is performed. If the peak LOC is below the target (beyond the acceptable deviation), then step 110 is performed. If the peak LOC is at the target value (again, within the acceptable deviation), then step 111 is performed.

At step 109, the gain of the selected PMT(n) is decreased, whereas at step 110 the gain is increased. Then, after either step, the spectrum is again collected in step 107, and step 108 is again performed.

However, when the peak LOC is at the target value, the gain of the PMT(n) is saved as the calibrated gain at step 111, and then, if there are additional PMTs to be calibrated (determined by step 112), the new PMT, i.e., PMT(n) (with n incremented) is selected and the just set PMT (i.e., PMT(n−1)) is reset to about a zero gain (as discussed above) at step 113, and the process continues for the newly selected PMT. This is done until all the calibrated gains of all of the PMTs have been determined and stored. These calibrated gains can then be used in the normal use of the detector until a new calibration is necessary.

Note that various changes to these steps, such as changes in the order of the steps, for example, are possible as additional embodiments, but are still within the scope of this invention. Furthermore, various steps might be omitted as well, and still remain within the scope.

To begin a gain calibration for the apparatus of the current embodiment, software implementing the flow chart of FIG. 4 is executed on the detector computer, and the user would select a button labeled, e.g., AutoGain to initiate the calibration. The software would cause the computer to prompt the user to mount the gain mask on the detector, and to position a radiation source of some specific strength, e.g., 5 milliCuries, some distance away from the detector, e.g., 5 feet. When ready, the user clicks <OK> and the calibration proceeds automatically from there, in a manner described for the current embodiment.

The invention has been described hereinabove using specific examples and implementations; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. A method for calibrating a radiation detector including a radiation sensor, said method comprising the steps of:
   setting a gain for the sensor to a non-zero value;
   irradiating the detector with a radiation source;
   collecting a radiation spectrum detected by the detector;
   calculating a peak energy location from the radiation spectrum;
   determining if the peak energy location is mislocated from a desired location beyond an acceptable deviation amount; and
   if the peak energy location is mislocated from a desired location beyond the acceptable deviation amount, adjusting the gain setting, wherein
   said method is performed for each of said plurality of sensors by setting the gain for all but a selected one of the sensors to zero, and setting the selected one of the sensor to the non-zero value, for performing said method, and then repeating said method for each of the plurality of sensors in a like manner, thereby resulting in an acceptable gain setting for each of the plurality of sensors.

2. The method of claim 1, wherein the sensor includes a photomultiplier tube.

3. The method of claim 2, wherein the photomultiplier tube is for detecting a flash of light emitted by a scintillator in response to the absorption of a gamma photon emitted by the radiation source.

4. The method of claim 3, wherein the radiation detector includes a plurality of radiation sensors, each including a photomultiplier tube, and wherein said method is performed for each of said plurality of sensors.

5. The method of claim 3, further comprising the step of covering the detector with a gain mask prior to said irradiating, wherein the gain mask has a hole through which radiation passes to the detector.

6. The method of claim 2, wherein the radiation detector includes a plurality of radiation sensors, each of said sensors including a photomultiplier tube, and wherein said method is performed for each of the plurality of sensors.

7. The method of claim 1, wherein the radiation detector includes a plurality of radiation sensors, and wherein said method is performed for each of the plurality of sensors.

8. The method of claim 1, further comprising the steps of performing said irradiating, collecting, calculating, determining and, if necessary, said adjusting steps until the peak energy location is located within the acceptable deviation from the desired location, thereby resulting in an acceptable gain setting for the sensor.

9. A method for calibrating a radiation detector including a plurality of radiation sensors, said method comprising the steps of:
   a) selecting one of the plurality of radiation sensors;

b) setting the gain for the selected radiation sensor to a non-zero value and setting the gain for the remaining of the plurality of radiation sensors to about zero;

c) irradiating the detector with a radiation source;

d) collecting a radiation spectrum detected by the detector during said irradiating step;

e) calculating a peak energy location from the radiation spectrum;

f) determining if the peak energy location is mislocated from a desired location beyond an acceptable deviation amount;

g) if said determining step determines that the peak energy location is mislocated, then adjusting the gain setting for the selected radiation sensor, and repeating steps (c) through (g) until said determining determines that the peak energy location is located within the acceptable deviation from the desired location;

h) recording the gain setting for the selected radiation sensor when said determining step determines that the peak energy location is located within the acceptable deviation from the desired location;

i) resetting the gain for the selected radiation sensor to about zero;

j) selecting another one of the plurality of radiation sensors; and k) performing steps (c) through (k) until each of the plurality of radiation sensors have been selected and their corresponding gains recorded.

10. The method of claim 9, wherein each of the plurality of sensors includes a photomultiplier tube.

11. The method of claim 10, wherein each photomultiplier tube is for detecting a flash of light emitted by a scintillator in response to the absorption of a gamma photon emitted by the radiation source.

12. The method of claim 9, further comprising the step of covering the detector with a gain mask prior to said irradiating, wherein the gain mask has a plurality of holes through which radiation passes to the detector.

13. The method of claim 12, wherein each of the plurality of sensors includes a photomultiplier tube, and wherein each one of some number of the plurality of holes of the gain mask is positioned at about a center of a photomultiplier tube of a corresponding one of the plurality of sensors.

14. A method for calibrating a radiation detector including a plurality of photomultiplier tubes, said method comprising the steps of:

setting an initial gain for each of the photomultiplier tubes;

irradiating the detector with a radiation source;

collecting a radiation spectrum for one or more of the plurality of photomultiplier tubes during said irradiating step;

calculating a peak energy location from the radiation spectrum;

determining if the peak energy location is mislocated from a desired location beyond an acceptable deviation amount;

if said determining step determines that the peak energy location is mislocated, then adjusting the gain setting for one or more of the one or more of the photomultiplier tubes; and repeating said irradiating, collecting, calculating, determining, and adjusting steps until said determining determines that the peak energy location is located within the acceptable deviation from the desired location for each of the plurality of photomultiplier tubes, thereby resulting in a calibrated gain setting for each of the plurality of photomultiplier tubes, wherein said initial gain setting for all but one of the photomultiplier tubes is set to about zero and the initial gain setting for the one of the photomultiplier tubes is set to a non-zero value.

15. A method for automatically calibrating a radiation detector including a plurality of photomultiplier tubes and a scintillator, said method comprising the steps of:

a) mounting a gain mask on the detector, wherein the gain mask has a plurality of holes;

b) automatically selecting one of the plurality of photomultiplier tubes;

c) automatically setting the gain for the selected photomultiplier tube to a non-zero value and setting the gain for the remainder of the plurality of photomultiplier tubes to about zero;

d) irradiating the detector with the radiation source, wherein radiation passes through the plurality of holes of the gain mask to the detector;

e) automatically collecting a radiation spectrum detected by the selected photomultiplier tube during said irradiating step;

f) automatically calculating a peak energy location from the radiation spectrum;

g) automatically determining if the peak energy location is mislocated from a desired location beyond an acceptable deviation amount;

h) if said determining step determines that the peak energy location is mislocated, then automatically adjusting the gain setting for the selected photomultiplier tube, and automatically repeating steps (d) through (h) until said determining step determines that the peak energy location is located within the acceptable deviation from the desired location;

i) automatically recording the gain setting for the selected photomultiplier tube when said determining step determines that the peak energy location is located within the acceptable deviation from the desired location;

j) automatically resetting the gain for the selected photomultiplier tube to about zero;

k) automatically selecting another one of the plurality of photomultiplier tubes; and l) automatically performing steps (d) through (l) until each of the plurality of photomultiplier tubes have been selected and calibrated.

16. The method of claim 15, wherein each photomultiplier tube is for detecting a flash of light emitted by a scintillator in response to the absorption of a gamma photon emitted by the radiation source and passing through one or more of the plurality of holes of the gain mask.

17. A radiation detector including a plurality of radiation sensors and an apparatus for calibrating the radiation detector, said apparatus comprising:

means for selecting one of said plurality of radiation sensors;

means for setting the gain for said selected radiation sensor to a non-zero value and for setting the gain for the remaining of said plurality of radiation sensors to about zero;

a gain mask having a plurality of holes each corresponding to one of the plurality of radiation sensors through which radiation from a radiation source passes to the detector;

means for irradiating the detector with the radiation source;

means for collecting a radiation spectrum detected by the detector during said irradiating;

means for calculating a peak energy location from the radiation spectrum;

means for determining if the peak energy location is mislocated from a desired location beyond an acceptable deviation amount;

means for adjusting said gain setting for said selected radiation sensor if said means for determining determines that the peak energy location is mislocated, until said means for determining determines that the peak energy location is located within the acceptable deviation from the desired location;

means for recording said gain setting for said selected radiation sensor in a memory when said means for determining determines that the peak energy location is located within the acceptable deviation from the desired location, wherein each one of said plurality of sensors is selected by said apparatus in order to record the gain setting of said each one of said plurality of sensors thereby calibrating said sensors.

18. A method for calibrating a radiation detector including a radiation sensor, said method comprising the steps of:

setting a gain for the sensor to a non-zero value;

irradiating the detector with a radiation source;

covering the detector with a gain mask prior to said irradiating, wherein the gain mask has at least one hole through which radiation passes to the detector;

collecting a radiation spectrum detected by the detector;

calculating a peak energy location from the radiation spectrum;

determining if the peak energy location is mislocated from a desired location beyond an acceptable deviation amount;

if the peak energy location is mislocated from a desired location beyond the acceptable deviation amount, adjusting the gain setting, wherein said method is performed for each of said plurality of sensors by initially setting the gain for all of the plurality of sensors to a non-zero value, and then collecting said spectrum for each sensor by finding the maximum value of all the sensors during said irradiating, and then choosing the sensor having the maximum value as the sensor of the method, and then repeating until an acceptable gain setting for each of the plurality of sensors has been found.

19. The method of claim 18, further comprising the steps of performing said irradiating, collecting, calculating, determining and, if necessary, said adjusting steps until the peak energy location is located within the acceptable deviation from the desired location, thereby resulting in an acceptable gain setting for the sensor.

20. The method of claim 19, wherein the sensor includes a photomultiplier tube.

21. The method of claim 20, wherein the photomultiplier tube is for detecting a flash of light emitted by a scintillator in response to the absorption of a gamma photon emitted by the radiation source.

22. A method for calibrating a radiation detector including a radiation sensor, said method comprising the steps of:

setting a gain for the sensor to a non-zero value;

irradiating the detector with a radiation source;

covering the detector with a gain mask prior to said irradiating, wherein the gain mask has at least one hole through which radiation passes to the detector;

collecting a radiation spectrum detected by the detector;

calculating a peak energy location from the radiation spectrum;

determining if the peak energy location is mislocated from a desired location beyond an acceptable deviation amount;

if the peak energy location is mislocated from a desired location beyond the acceptable deviation amount, adjusting the gain setting, wherein said method is performed for each of said plurality of sensors by setting the gain for all but a selected one of the sensors to zero, and setting the selected one of the sensor to the non-zero value, for performing said method, and then repeating said method for each of the plurality of sensors in a like manner, thereby resulting in an acceptable gain setting for each of the plurality of sensors.

23. The method of claim 22, further comprising the steps of performing said irradiating, collecting, calculating, determining and, if necessary, said adjusting steps until the peak energy location is located within the acceptable deviation from the desired location, thereby resulting in an acceptable gain setting for the sensor.

24. A method for calibrating a radiation detector including a plurality of photomultiplier tubes, said method comprising the steps of:

setting an initial gain for each of the photomultiplier tubes;

covering the detector with a gain mask having plurality of holes through which radiation can pass to the detector;

irradiating the detector with a radiation source;

collecting a radiation spectrum for one or more of the plurality of photomultiplier tubes during said irradiating step;

calculating a peak energy location from the radiation spectrum;

determining if the peak energy location is mislocated from a desired location beyond an acceptable deviation amount;

if said determining step determines that the peak energy location is mislocated, then adjusting the gain setting for one or more of the one or more of the photomultiplier tubes; and repeating said irradiating, collecting, calculating, determining, and adjusting steps until said determining determines that the peak energy location is located within the acceptable deviation from the desired location for each of the plurality of photomultiplier tubes, thereby resulting in a calibrated gain setting for each of the plurality of photomultiplier tubes, wherein said initial gain setting for all but one of the photomultiplier tubes is set to about zero and the initial gain setting for the one of the photomultiplier tubes is set to a non-zero value.

25. The method of claim 24, wherein said initial gain setting is set to a non-zero value for each of the photomultiplier tubes.

* * * * *